US007540013B2

(12) United States Patent
Freund (10) Patent No.: US 7,540,013 B2
(45) Date of Patent: May 26, 2009

(54) SYSTEM AND METHODOLOGY FOR PROTECTING NEW COMPUTERS BY APPLYING A PRECONFIGURED SECURITY UPDATE POLICY (75) Inventor: Gregor P. Freund, San Francisco, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 657 days.

(21) Appl. No.: 10/710,781

(22) Filed: Aug. 2, 2004

(65) Prior Publication Data
US 2005/0273841 A1 Dec. 8, 2005

Related U.S. Application Data (60) Provisional application No. 60/521,620, filed on Jun. 7, 2004.

(51) Int. Cl.
*G06F 17/00* (2006.01)
(52) U.S. Cl. .................. 726/1; 713/152; 713/187; 709/225; 709/244
(58) Field of Classification Search .................. 726/11, 726/1; 713/200, 201
See application file for complete search history.

(56) References Cited

U.S. PATENT DOCUMENTS

| | | | | |
|---|---|---|---|---|
| 5,164,988 A | 11/1992 | Matyas et al. | ............... | 713/156 |
| 5,903,652 A | 5/1999 | Mital | ............... | 705/78 |
| 5,950,195 A | 9/1999 | Stockwell et al. | ............... | 707/4 |
| 5,987,611 A | 11/1999 | Freund | ............... | 713/201 |
| 6,067,620 A | 5/2000 | Holden et al. | ............... | 713/155 |
| 6,098,173 A | 8/2000 | Elgressy et al. | ............... | 713/201 |
| 6,163,843 A | 12/2000 | Inoue et al. | ............... | 726/11 |
| 6,167,513 A | 12/2000 | Inoue et al. | ............... | 713/150 |
| 6,170,057 B1 | 1/2001 | Inoue et al. | ............... | 713/153 |
| 6,202,157 B1 | 3/2001 | Brownlie et al. | ............... | 713/201 |
| 6,321,334 B1 * | 11/2001 | Jerger et al. | ............... | 726/1 |
| 6,341,352 B1 | 1/2002 | Child et al. | ............... | 726/1 |
| 6,345,361 B1 * | 2/2002 | Jerger et al. | ............... | 726/3 |
| 6,430,561 B1 | 8/2002 | Austel et al. | ............... | 707/9 |
| 6,453,419 B1 | 9/2002 | Flint et al. | ............... | 713/201 |
| 6,473,800 B1 * | 10/2002 | Jerger et al. | ............... | 709/226 |
| 6,499,110 B1 | 12/2002 | Moses et al. | ............... | 713/201 |
| 6,553,498 B1 | 4/2003 | Elgressy et al. | ............... | 713/201 |
| 6,577,274 B1 * | 6/2003 | Bajikar | ............... | 342/450 |
| 6,622,150 B1 | 9/2003 | Kouznetsov et al. | ............... | 118/664 |
| 6,738,908 B1 | 5/2004 | Bonn et al. | ............... | 726/4 |
| 6,775,536 B1 | 8/2004 | Geiger et al. | ............... | 455/411 |
| 6,779,120 B1 | 8/2004 | Valente et al. | ............... | 726/1 |
| 6,904,466 B1 | 6/2005 | Ishiyama et al. | ............... | 709/245 |
| 6,920,558 B2 | 7/2005 | Sames et al. | ............... | 713/166 |

(Continued)

*Primary Examiner*—Matthew B Smithers
*Assistant Examiner*—Shewaye Gelagay
(74) *Attorney, Agent, or Firm*—John A. Smart (57) ABSTRACT A system and methodology for protecting new computers by applying a preconfigured security update policy is described. In one embodiment, for example, a method is described for controlling connections to a computer upon its initial deployment, the method comprises steps of: upon initial deployment of the computer, applying a preconfigured security policy that establishes a restricted zone of preapproved hosts that the computer may connect to upon its initial deployment; receiving a request for a connection from the computer to a particular host; based on the preconfigured security policy, determining whether the particular host is within the restricted zone of preapproved hosts; and blocking the connection if the particular host is not within the restricted zone of preapproved hosts.

70 Claims, 5 Drawing Sheets

U.S. PATENT DOCUMENTS

| | | | |
|---|---|---|---|
| 6,941,471 B2 | 9/2005 | Lin | 726/1 |
| 7,047,288 B2 | 5/2006 | Cooper et al. | 709/223 |
| 7,051,366 B1 | 5/2006 | LaMacchia et al. | 726/14 |
| 7,055,173 B1* | 5/2006 | Chaganty et al. | 726/11 |
| 7,069,434 B1* | 6/2006 | Ilnicki et al. | 713/153 |
| 7,093,283 B1 | 8/2006 | Chen et al. | 726/6 |
| 7,111,321 B1 | 9/2006 | Watts et al. | 726/2 |
| 7,146,639 B2* | 12/2006 | Bartal et al. | 726/11 |
| 7,194,004 B1* | 3/2007 | Thomsen | 370/401 |
| 7,197,037 B2* | 3/2007 | Mori et al. | 370/392 |
| 7,207,061 B2* | 4/2007 | Martin | 726/11 |
| 2002/0010798 A1* | 1/2002 | Ben-Shaul et al. | 709/247 |
| 2002/0023010 A1* | 2/2002 | Rittmaster et al. | 705/26 |
| 2003/0046583 A1* | 3/2003 | Goldman et al. | 713/201 |
| 2003/0079146 A1* | 4/2003 | Burstein | 713/201 |
| 2003/0084331 A1* | 5/2003 | Dixon et al. | 713/200 |
| 2003/0167405 A1* | 9/2003 | Freund et al. | 713/201 |
| 2003/0177389 A1* | 9/2003 | Albert et al. | 713/201 |
| 2003/0188001 A1* | 10/2003 | Eisenberg et al. | 709/229 |
| 2003/0208382 A1* | 11/2003 | Westfall | 705/3 |
| 2004/0117215 A1* | 6/2004 | Marchosky | 705/3 |
| 2004/0121648 A1* | 6/2004 | Voros | 439/535 |
| 2004/0128540 A1* | 7/2004 | Roskind | 713/201 |
| 2004/0143702 A1* | 7/2004 | Valdevit | 711/111 |
| 2004/0146698 A1* | 7/2004 | Pace et al. | 428/195.1 |
| 2004/0162992 A1* | 8/2004 | Sami et al. | 713/200 |
| 2004/0177274 A1* | 9/2004 | Aroya | 713/201 |
| 2005/0246767 A1* | 11/2005 | Fazal et al. | 726/11 |

* cited by examiner

SYSTEM AND METHODOLOGY FOR PROTECTING NEW COMPUTERS BY APPLYING A PRECONFIGURED SECURITY UPDATE POLICY

CROSS REFERENCE TO RELATED APPLICATIONS

The present application is related to and claims the benefit of priority of the following commonly-owned, presently-pending provisional application(s): application Ser. No. 60/521,620, filed Jun. 7, 2004, entitled "System and Methodology for Protecting New Computers by Applying a Preconfigured Security Update Policy", of which the present application is a non-provisional application thereof. The present application is related to the following commonly-owned, presently-pending application(s): application Ser. No. 09/944,057, filed Aug. 30, 2001, entitled "System Providing Internet Access Management with Router-based Policy Enforcement"; application Ser. No. 10/159,820, filed May 31, 2002, entitled "System and Methodology for Security Policy Arbitration". The disclosures of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field of the Invention

The present invention relates generally to systems and methods for maintaining security of computer systems connected to one or more networks (Local Area Networks or Wide Area Networks) and, more particularly, to a system and methodology for securing newly acquired computers from security breaches by applying a preconfigured or preset security update policy.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs". In both cases, maintaining security and controlling what information a computer user could access was relatively simple because the overall computing environment was limited and clearly defined.

In traditional computing networks, a desktop computer largely remained in a fixed location and was physically connected to a single local network (e.g., via Ethernet). More recently, however, an increasingly large number of business and individual users are using portable computing devices, such as laptop computers, that are moved frequently and that connect into more than one network. For example, many users now have laptop computers that can be connected to networks at home, at work, and in numerous other locations. Many users also have home computers that are remotely connected to various organizations from time to time through the Internet. The number of computing devices, and the number of networks that these devices connect to, has increased dramatically in recent years.

In addition, various different types of connections may be utilized to connect to these different networks. A dial-up modem may be used for remote access to an office network. Various types of wireless connectivity, including IEEE (Institute of Electrical and Electronics Engineers) 802.11 and Bluetooth, are also increasingly popular. Wireless networks often have a large number of different users. Moreover, connection to these networks is often very easy, as connection does not require a physical link. Wireless and other types of networks are frequently provided in cafes, airports, convention centers, and other public locations to enable mobile computer users to connect to the Internet. Increasingly, users are also using the Internet to remotely connect to a number of different systems and networks. Thus, it is becoming more common for users to connect to a number of different networks from time to time through a number of different means.

One of the implications of this increasing number of devices occasionally connected to different networks is that traditional corporate firewall technologies are no longer effective. Traditional firewall products guard a boundary (or gateway) between a local network, such as a corporate network, and a larger network, such as the Internet. These products primarily regulate traffic between physical networks by establishing and enforcing rules that regulate access based upon the protocol and type of access request, the source requesting access, the connection port to be accessed, and other factors. For example, a firewall may permit access to a particular computer using TCP/IP on TCP port 80, but deny remote access to other computers on the network. A firewall may also permit access from a specific IP address or range (or zone) of IP addresses, but deny access from other addresses. Different security rules may be defined for different zones of addresses. However, traditional firewall technology guarding a network boundary does not protect against traffic that does not traverse that boundary. It does not regulate traffic between two devices within the network or two devices outside the network. A corporate firewall provides some degree of protection when a device is connected to that particular corporate network, but it provides no protection when the device is connected to other networks.

One security measure that has been utilized by many users is to install a personal firewall (or end point security) product on a computer system to control traffic into and out of the system. An end point security product can regulate all traffic into and out of a particular computing device. For example, an end point security product may expressly seek authorization from a user or administrator (or from a policy established by a user or administrator) for each network connection to or from a computing device, including connections initiated from the device and those initiated from external sources. This enables a user or administrator to monitor what applications on a device are accessing other machines or networks (e.g., the Internet). It also enforces security by obtaining authorization for each Internet or network connection opened to (or from) the device, including connections initiated both internally and externally. In the home environment, for instance, an end point security product enables a home user to monitor the applications he or she is using and enforces security by requiring his or her authorization for each connection. Typically, for connections initiated from the device, a user may configure application permission rules that permit certain applications to connect to one or more networks or devices, such as a local area network (LAN) or a wide area network (WAN), such as the Internet. These application permission rules may, for instance, permit a particular application, such as a Web browser program, to open connections to the Internet. A rule may also be configured to permit an application to access another computer on the same LAN, but prohibit this application from opening an Internet connection.

Despite the increasing use of end point security and antivirus products, issues remain. Consumers currently face a particular problem when buying a new computer. Because of restrictions during the manufacturing process (e.g., due to cost/overhead issues, licensing restrictions, etc.), computers today tend to be outdated in terms of security by the time consumers actually have an opportunity to purchase those computers. For example, computers are frequently sold to consumers with an antivirus program already installed. However, the antivirus program and/or the virus definition files are typically out of date by the time the computer is actually received and placed into use by consumers. In order to update a computer for bringing it into compliance with current security updates, the user is required to connect the new computer to the Internet for accessing certain vendor sites, for example for obtaining the latest antivirus definition file. Since a number of manufacturers update hard disk images for their computer lines only once or twice a year, a user may need to not only update data files (e.g., virus definition files) but also completely update the underlying security software itself, such as updating the underlying antivirus software (engine). Manufacturers' practice of annual or semi-annual updating is highly problematic. In terms of protection for a computer, that practice translates into a security system that may be up to 12 months out of date by the time the system actually gets into consumer hands.

Even if a consumer does everything exactly right with a new computer (e.g., updating antivirus software and data files, updating firewall software, updating operating system software, patching any applications with known vulnerabilities, etc.), he or she is required to spend a considerable amount of time online in order to get the "new" machine to a point where its security system is no longer out of date. For example, a new virus software update (e.g., from Symantec or McAfee) can easily run 15-20 MB to download. A new operating system service pack update (e.g., from Microsoft) may require a 100+ MB download. All told, the present day approach to delivering new computers requires consumers to spend a considerable amount of time online with an outdated security system—that is, a system which may have a long list of known vulnerabilities that hackers constantly scan for. As a concrete example from the inventor's own experience, a new notebook computer purchased while traveling was infected with the MS-Blast worm before even the brief task of downloading current firewall software (e.g., ZoneAlarm®, which is a fairly small download) could be completed.

To date, the only approach to addressing the foregoing is to preinstall antivirus and firewall/end point security software, as part of a computer's manufacturer-provided hard disk image. However as outlined above, with the current approach of manufacturing hard disk images, the preinstalled software is out of date by the time it actually reaches consumers. Accordingly, the foregoing problem of an initial infection has continued to plague consumers. Further compounding the problem, once a new machine has sustained an initial affection, the malicious software (e.g., virus, worm, etc.) can sabotage the machine, thus preventing the user from getting required downloads in order to bring the computer's security system up to date. In other words, the initial infection prolongs the user's inability to get appropriate updates. Since malicious software often tends to be poorly written, infected machines tend to be prone to crashing. Although the failure comes from the infection, users may instead blame the computer manufacturer for a defective device: they bought a brand new machine and it failed, therefore it must be a defective machine. This leads to increased support/warranty costs and product returns for manufacturers, even though the failures are not necessarily a result of manufacturing defects.

What is needed is a solution for protecting newly purchased computers from viruses, worms, and other malicious software. The solution should protect the computer when it is initially received by the user and should facilitate the process of obtaining required updates in order to bring the computer's security system up to date. The present invention provides a solution for these and other needs.

SUMMARY OF INVENTION

A system and methodology for protecting new computers by applying a preconfigured security update policy is described. In one embodiment, for example, a method of the present invention is described for controlling connections to a computer upon its initial deployment, the method comprises steps of: upon initial deployment of the computer, applying a preconfigured security policy that establishes a restricted zone of preapproved hosts that the computer may connect to upon its initial deployment; receiving a request for a connection from the computer to a particular host; based on the preconfigured security policy, determining whether the particular host is within the restricted zone of preapproved hosts; and blocking the connection if the particular host is not within the restricted zone of preapproved hosts.

In another embodiment, for example, a computer system of the present invention that is preconfigured to control connections upon initial deployment is described that comprises: a computer having a preconfigured security policy that establishes a restricted zone of preapproved hosts that the computer may connect to upon initial deployment of the computer; a connectivity module for processing user requests for the computer to connect to a particular host; and a security module for determining whether the particular host is within the restricted zone of preapproved hosts based on the preconfigured security policy, and for blocking any attempt to connect to a host that is not within the restricted zone of preapproved hosts.

In yet another embodiment, for example, a method of the present invention is described for enforcing pre-access connectivity restrictions on a new machine, the method comprises steps of: detecting attempts to connect the new machine to other devices; determining, based on an initial security policy that establishes a restricted zone of acceptable connections, which devices the new machine is permitted to connect to; and blocking any connection that attempts to connect the new machine to a device outside the restricted zone of acceptable connections.

DETAILED DESCRIPTION

Glossary

The following definitions are offered for purposes of illustration, not limitation, in order to assist with understanding the discussion that follows.

End point security: End point security is a way of managing and enforcing security on each computer instead of relying upon a remote firewall or a remote gateway to provide security for the local machine or environment. End point security involves a security agent that resides locally on each machine. This agent monitors and controls the interaction of the local machine with other machines and devices that are connected on a LAN or a larger wide area network (WAN), such as the Internet, in order to provide security to the machine.

Firewall: A firewall is a set of related programs, typically located at a network gateway server, that protects the resources of a private network from other networks by controlling access into and out of the private network. (The term also implies the security policy that is used with the programs.) A firewall, working closely with a router program, examines each network packet to determine whether to forward it toward its destination. A firewall may also include or work with a proxy server that makes network requests on behalf of users. A firewall is often installed in a specially designated computer separate from the rest of the network so that no incoming request directly accesses private network resources.

HTTP: HTTP is the acronym for HyperText Transfer Protocol, which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in "RFC 2616: Hypertext Transfer Protocol—HTTP/1.1", the disclosure of which is hereby incorporated by reference. RFC 2616 is available from the World Wide Web Consortium (W3C), and is available via the Internet (e.g., currently at www.w3.org/Protocols/). Additional description of HTTP is available in the technical and trade literature, see e.g., Stallings, W., "The Backbone of the Web", BYTE, October 1996, the disclosure of which is hereby incorporated by reference.

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

RPC: RPC stands for remote procedure call, a type of protocol that allows a program on one computer to execute a program on another computer (e.g., a server computer). Using RPC, a system developer need not develop specific procedures for the server. The client program sends a message to the server with appropriate arguments and the server returns a message containing the results of the program executed. For further description of RPC, see e.g., RFC 1831 titled "RPC: Remote Procedure Call Protocol Specification Version 2", available from the Internet Engineering Task Force (IETF), the disclosure of which is hereby incorporated by reference. A copy of RFC 1831 is available via the Internet (e.g., currently at www.ietf.org/rfc/rfc1831.txt).

Security policy: In general terms, a security policy is an organization's statement defining the rules and practices that regulate how it will provide security, handle intrusions, and recover from damage caused by security breaches. An explicit and well-defined security policy includes a set of rules that are used to determine whether a given subject will be permitted to gain access to a specific object. A security policy may be enforced by hardware and software systems that effectively implement access rules for access to systems and information. Further information on security policies is available in "RFC 2196: Site Security Handbook, (September 1997)", the disclosure of which is hereby incorporated by reference. A copy of RFC 2196 is available from the IETF via the Internet (e.g., currently at www.ietf.org/rfc/rfc2196.txt). For additional information, see also, e.g., "RFC 2704: The KeyNote Trust Management System Version 2", the disclosure of which is hereby incorporated by reference. A copy of RFC 2704 is available from the IETF via the Internet (e.g., currently at www.ietf.org/rfc/rfc2704.txt). In this document, "security policy" or "policy" refers to a set of security policies and rules employed by an individual or by a corporation, government entity, or any other organization operating a network or other computing resources.

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see e.g., "RFC 793: Transmission Control Program DARPA Internet Program Protocol Specification", the disclosure of which is hereby incorporated by reference. A copy of RFC 793 is available via the Internet (e.g., currently at www.ietf.org/rfc/rfc793.txt).

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", the disclosure of which is hereby incorporated by reference. A copy of RFC 1180 is available via the Internet (e.g., currently at www.ietf.org/rfc/rfc1180.txt).

UDP: UDP stands for User Datagram Protocol, a connectionless protocol that, like TCP, runs on top of IP networks. Unlike TCP/IP, UDP/IP provides very few error recovery services, offering instead a direct way to send and receive datagrams over an IP network. UDP is used primarily for broadcasting messages over a network. For additional information on UDP, see RFC 768, "User Datagram Protocol", the disclosure of which is hereby incorporated by reference. A copy of RFC 768 is available via the Internet (e.g., currently at www.ietf.org/rfc/rfc768.txt).

URL: URL is an abbreviation of Uniform Resource Locator, the global address of documents and other resources on the World Wide Web. The first part of the address indicates what protocol to use, and the second part specifies the IP address or the domain name where the resource is located.

Winsock: Windows Sockets 2 (Winsock) is a Microsoft-provided interface that enables programmers to create advanced Internet, intranet, and other network-capable applications to transmit application data across the wire, independent of the network protocol being used. With Winsock, programmers are provided access to advanced Microsoft Windows networking capabilities such as multicast and Quality of Service (QOS). Winsock follows the Windows Open System Architecture (WOSA) model; it defines a standard service provider interface (SPI) between the application programming interface (API), with its exported functions and the protocol stacks. It uses the sockets paradigm that was first popularized by Berkeley Software Distribution (BSD) UNIX. It was later adapted for Windows in Windows Sockets 1.1, with which Windows Sockets 2 applications are backward compatible. Winsock programming previously centered around TCP/IP. Some programming practices that worked with TCP/IP do not work with every protocol. As a result, the Windows Sockets 2 API adds functions where necessary to handle several protocols. For further information regarding Winsock, see e.g., "Winsock Reference", available from Microsoft Corporation, the disclosure of which is hereby incorporated by reference. A copy of this documentation is available via the Internet (e.g., currently at msdn.microsoft.com/library/default.asp?url=/library/enus/winsock/winsock/winsock_reference.asp).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware (e.g., for Desktop and Server Computers)

Figure 1:
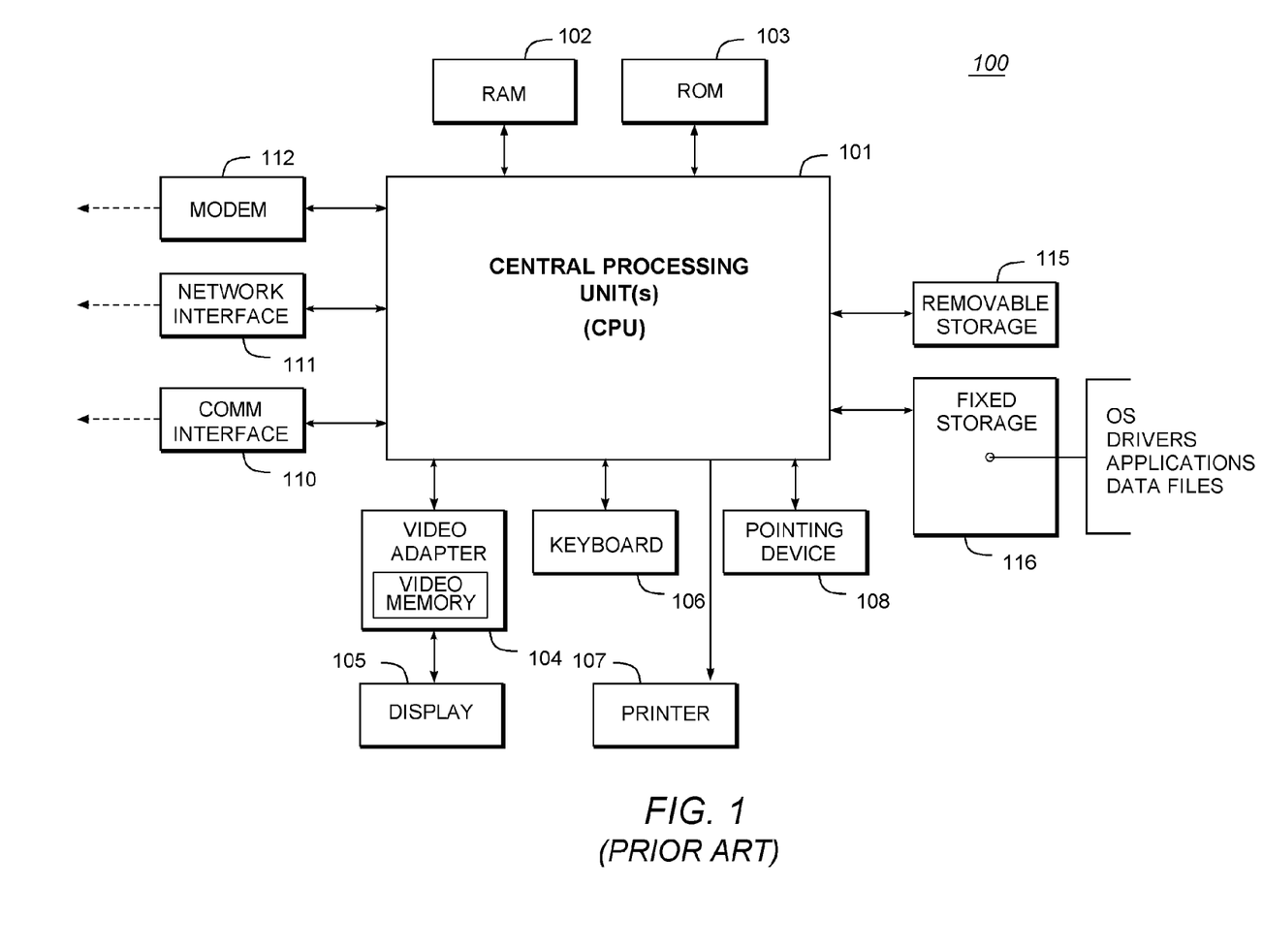
FIG. 1 is a very general block diagram of a computer system (e.g., an IBM-compatible system) in which software-implemented processes of the present invention may be embodied.

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
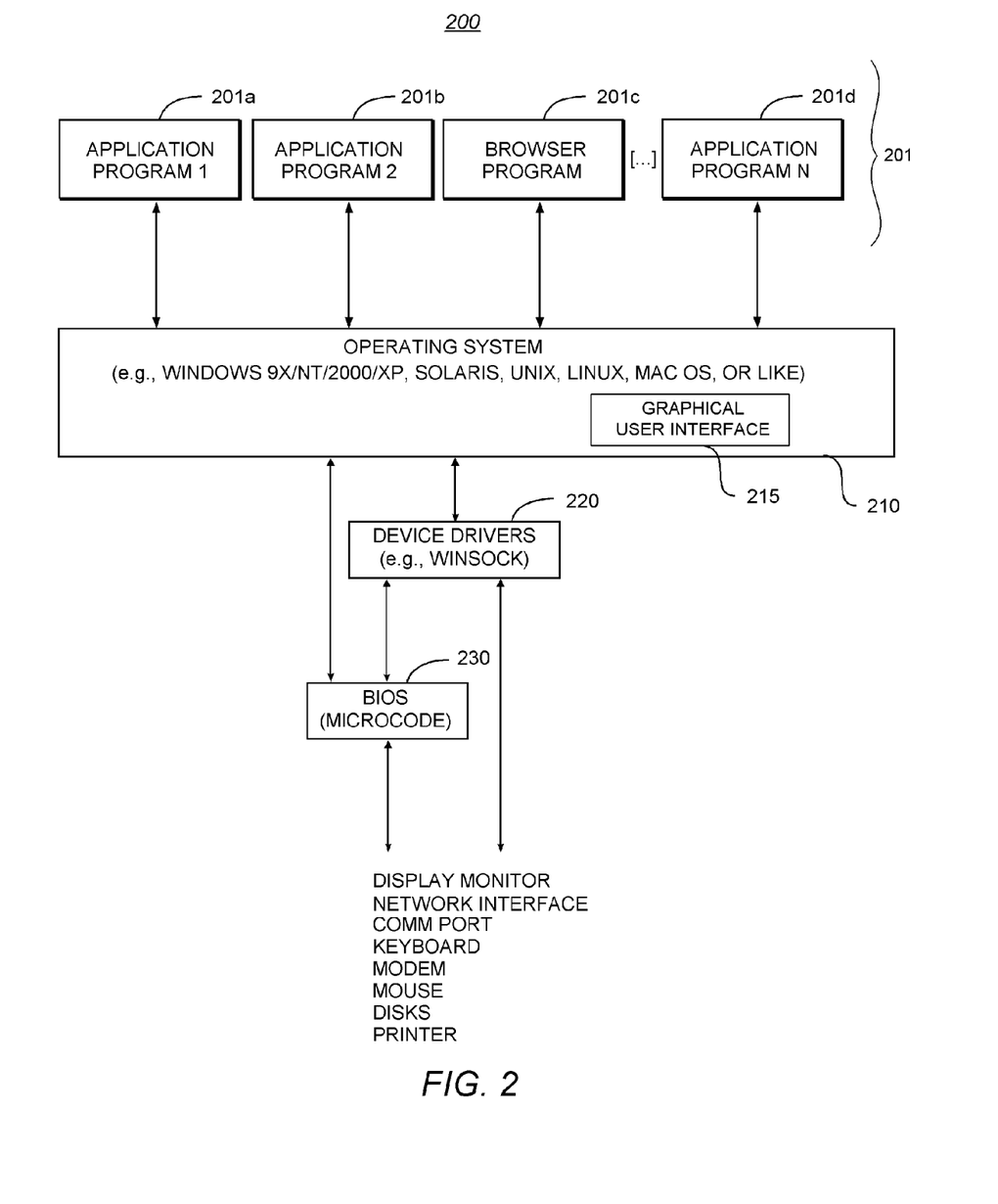
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists connectivity of one device (e.g., desktop computer or "client") to another (e.g., "server"). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Protecting Newly Deployed Computers

Introduction

Classically, security has been divided in zones, such as a "trusted" zone (e.g., for one's own computer) and an "untrusted" zone (e.g., for the Internet). A "trusted zone" is a group of trusted computers defined by a user (or administrator) that is typically subject to less restrictive security rules than other computers and devices. For example, several computers in a home network may be included in the trusted zone of a user's security policy. Typically, all computers outside the trusted zone defined by the user are considered to be part of the "untrusted" zone. For example, remote machines accessible via the Internet are generally "untrusted" and subject to more stringent security rules.

In accordance with the present invention, a new zone is introduced: a "restricted" zone (or "pre-access restricted zone") specifically for a new machine. Since the new machine operates in a restricted zone upon the initial deployment, the machine initially cannot be remotely accessed by another computer (e.g., a computer which is connected via a LAN or WAN). This restriction specifically addresses hacker probes, such as the MS-Blast worm. In the case of MS-Blast, a machine is not infected as a result of connecting to some malicious Web site or server. Instead, the MS-Blast worm infects machines by scanning open ports on machines and then delivering its malicious payload through a vulnerable port. In particular, the MS-Blast worm exploits a vulnerability of the RPC (Remote Procedure Call) service built into Microsoft Windows. The RPC service facilitates communication between applications and services over a network. The MS-Blast worm scans the local network for PCs that have port 135 open. If the worm finds such a target, it exploits the RPC vulnerability and infects the PC with a copy of itself. Once on a PC, the worm attempts to spread further and interfere with normal OS operation. The worm also attempts to use infected computers in a distributed denial-of-service attack against Microsoft's Windows Update site.

Overview to Pre-access Restricted Zone

In accordance with the present invention, when a manufacturer builds a hard disk image for a machine, the manufacturer places not only firewall and antivirus software on that image, but also sets up for the machine a set of pre-access firewall and access rules that limit the machine at the system level to only accessing specific sites (i.e., sites that the manufacture is aware of at the time that the image is built). In this manner, each machine receiving that image will be limited to only contacting a limited set of security-relevant sites (i.e., pre-access restricted zone). Importantly, all other attempted connections to the machine (i.e., from non-approved addresses) are refused during the pre- and peri-access stage. Only upon a given machine completing updating of security subsystems is the machine's security policy updated to allow other connections to occur. In particular, until the machine has updated relevant security components, the machine is not allowed to participate with general connectivity to the Internet, and the user is informed that is unsafe to do so until the security-relevant updates have been completed. The user may be given the option to override this pre-access restriction, but in that case the user assumes responsibility for his or her actions. In such a case, for example, the system may display a disclaimer/warning dialog that records the user's acknowledgment to assume such responsibility. Using the approach of the present invention, when a new machine is first connected to a network with Internet connectivity, the machine does not participate in general connectivity but instead is only allowed to connect to relevant update sites, such as an antivirus update site, a firewall update site, an operating system update site, and other such sites for updating components that may require security-relevant updates/upgrades.

System Components

Figure 3:
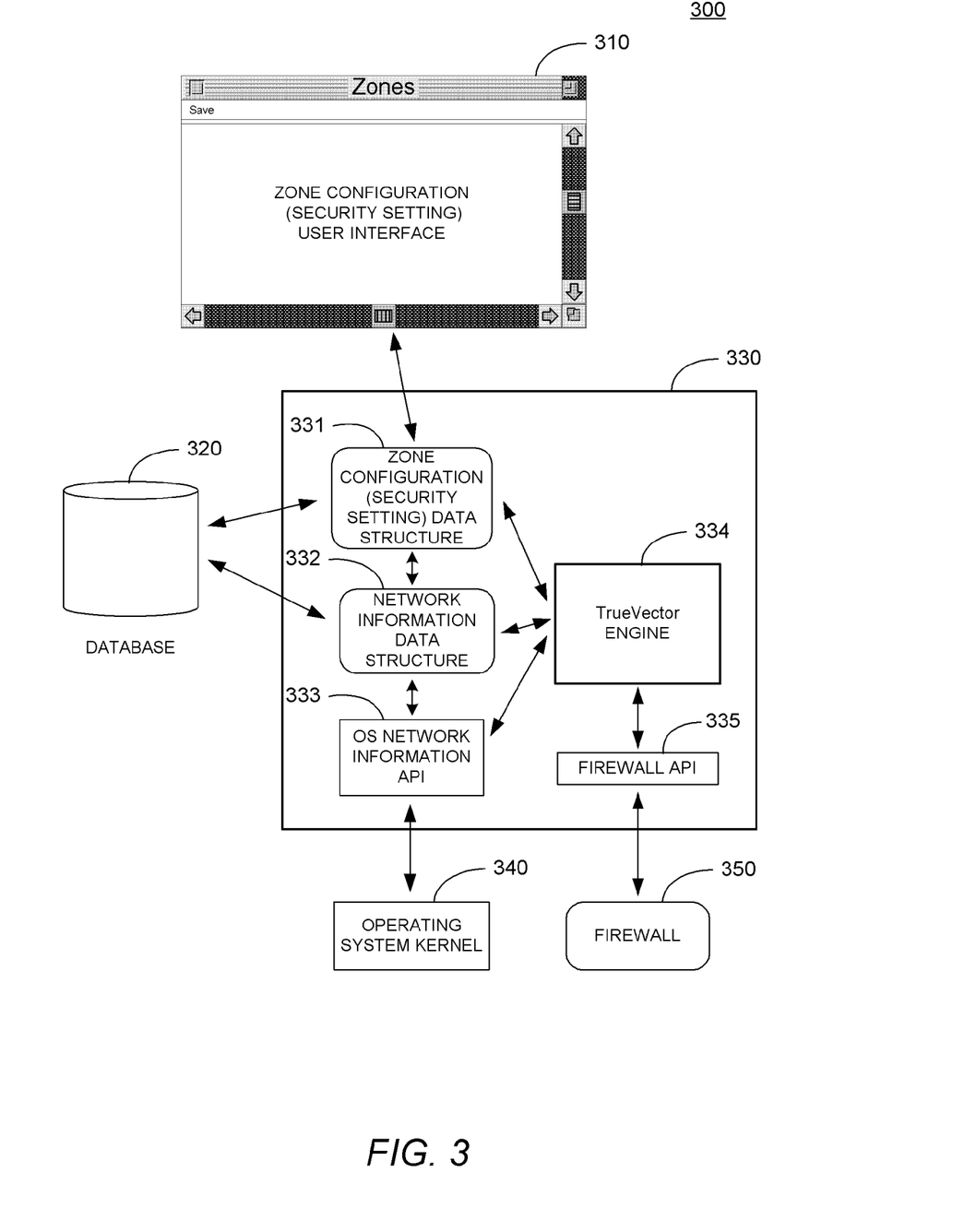
FIG. 3 is a block diagram of an environment in which the present invention is preferably embodied.

FIG. 3 is a block diagram of an environment 300 in which the present invention is preferably embodied. As shown on FIG. 3, environment 300 includes a security setting (or zone configuration) user interface 310, a database 320, a security system 330, an operating system kernel 340 and a firewall 350. Security system 330 includes a zone configuration (security setting) data structure 331, a network information data structure 332, an OS network information API 333, a TrueVector® engine 334, and a firewall API 335. Each of these components will now be described in more detail.

The zone configuration (security setting) user interface 310 is a configuration tool that enables a user or administrator to establish security settings and apply those settings to one or more machines or subnets. The zone configuration user interface 310 is connected to the security system 330. The zone configuration settings (or security settings) established for the current machine or network are stored in the zone configuration (security setting) data structure 331. The zone configuration settings, which comprise security settings or rules for particular networks or groups of machines, are also persistently stored in the database (or policy module) 320. In the currently preferred embodiment, the database 320 is a hierarchical object-oriented database. However, the database 320 could alternatively be a relational database, a file system, and/or any other form of persistent storage. The network information data structure 332 includes information about the network or networks to which a device is currently connected and also contains the profile of these networks. Information regarding networks to which a device has been connected is persistently stored in the database 320.

The OS network information API 333 is an interface used to obtain network information from the operating system kernel 340. For example, the OS network information API 333 may be used to obtain an IP address of a particular adapter, or multiple IP addresses of devices on a particular subnet. The OS network information API 333 is also used to determine the MAC address of any router or other gateway device that is serving the local subnet. A MAC address is a unique identification number that is assigned by the manufacturer to a specific router or device. For example, when a router sends a packet to another router, the router transmitting the packet identifies itself by both an IP address and a MAC address. Each operating system provides some facility to discover network information, including IP and MAC addresses. The OS network information API 333 enables the security system 330 to utilize this underlying operating system facility to obtain network information that is required to detect and profile different networks. As described below, different operating systems provide different facilities for the provision of network information.

The TrueVector® engine 334 receives messages regarding events and uses event handlers to process and respond to these messages. The engine 334 also sends messages to other components, for example a message through the firewall API 335 to make a configuration change to the firewall 350. In the currently preferred embodiment, security and behavioral policy definition and enforcement (e.g., definition and enforcement of firewall, network access, and antivirus policies) are provided by the TrueVector® engine available from Zone Labs, Inc. and described in further detail in commonly-owned U.S. Pat. No. 5,987,611, entitled "System and Methodology for Managing Internet access on a per Application basis for Client Computers Connected to the Internet", the disclosure of which is hereby incorporated by reference.

The TrueVector engine 334 acts as a supervisor module for enforcing a security policy (i.e., set of security rules). The TrueVector engine can be used to enforce a variety of different types of security policies or rules. These security policies may include application permission rules, such as a rule preventing access to particular resources by a particular application (e.g., a RealAudio player application "ra32.exe") or a rule permitting access to only administrator or user-approved applications. Similarly, a policy or rule can be established requiring a particular application to have a verifiable digital signature. Apart from application-based rules, policies can be established on the basis of non-application activities or features. For example, rules can also be established on the basis of including and/or excluding access to particular Internet sites. These security policies can be customized by a user or administrator and a multitude of different types of policy rules can be established and enforced, as desired. Further information regarding the establishment and enforcement of security policies is provided in commonly-owned application Ser. No. 09/944,057, filed Aug. 30, 2001, entitled "System Providing Internet Access Management with Router-based Policy Enforcement", and in commonly-owned application Ser. No. 10/159,820, filed May 31, 2002, entitled "System and Method for Security Policy Arbitration". The foregoing references are hereby incorporated by reference in their entirety, including any appendices or attachments thereof, for all purposes.

The firewall API 335 is used to enable dynamic configuration of the firewall 350. The firewall 350 is a firewall that includes a means to configure IP address groups, which are used to specify trusted zones and other zones. For example, using the firewall API 335, a computer or device (or a group of computers and devices) can be added to a trusted zone maintained by the firewall 350 without having to change the security settings applicable to that trusted zone. Operation of the foregoing components for performing the methodology of the present invention is next described.

Detailed Operation

Figure 4:
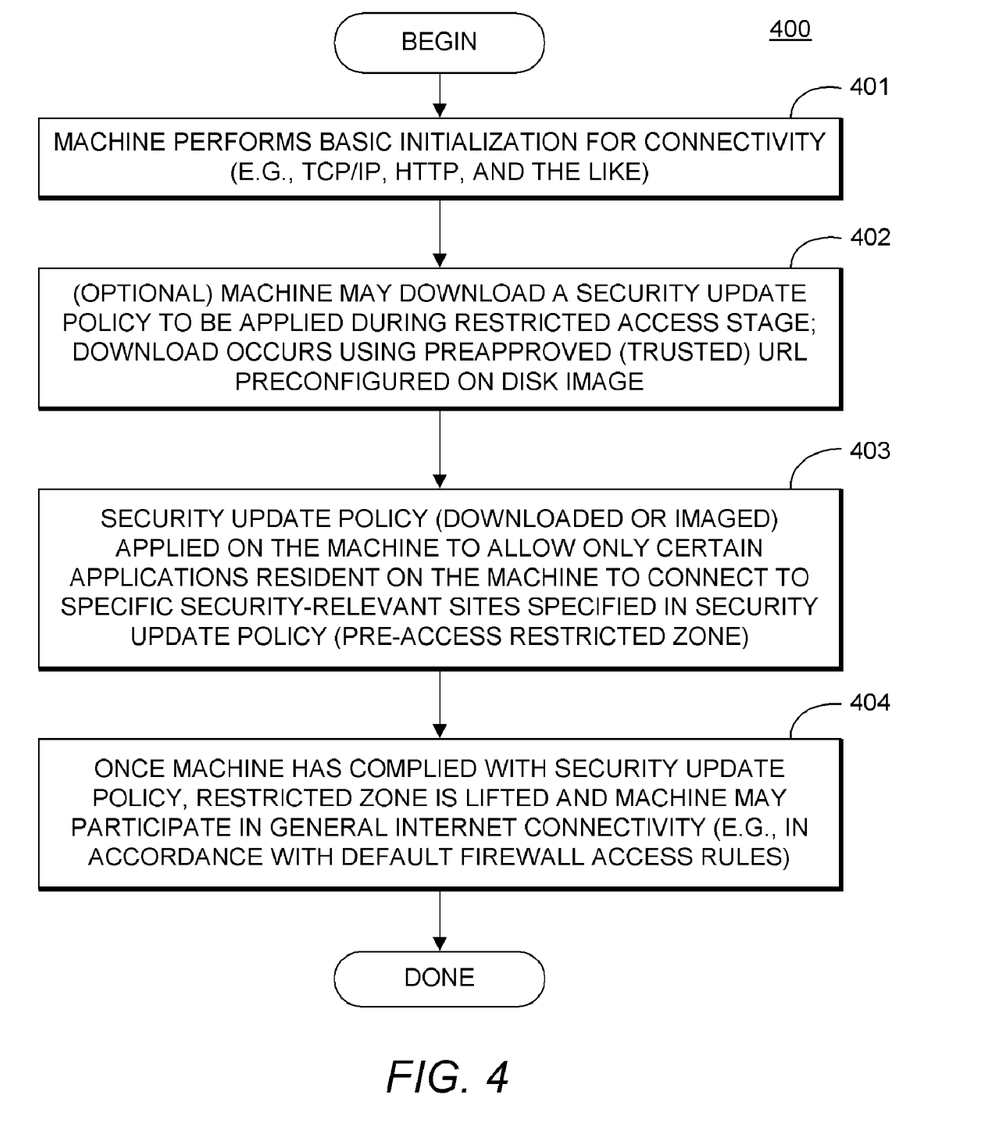
FIG. 4 is a flowchart illustrating the methodology of the present invention for enforcing pre-access connectivity restrictions on a new machine.

FIG. 4 is a flowchart 400 illustrating the methodology of the present invention for enforcing pre-access connectivity restrictions on a new machine. The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

The method of the present invention for enforcing pre-access connectivity restrictions on a new machine configured with a disk image constructed in accordance with the present invention may be summarized as follows. At step 401, the machine performs its usual basic initialization for connectivity (e.g., TCP/IP, HTTP, and the like). At step 402, the machine may, as an optional step, download a "security update policy" to be applied during the restricted access stage; the download occurs using a preapproved (trusted) URL that has been preconfigured on the disk image. In that instance, the machine is preconfigured to only allow access to that specific site for downloading the security update policy. The advantage of this optional step is that it provides more flexibility during the restricted access stage. For example, over the span of a year (i.e., the lifespan of the disk image) the operating system vendor (e.g., Microsoft) may have changed the location of its update site; a downloadable security update policy may easily pick up such changes. In the event that optional step 402 is not employed, then the machine instead employs a predefined (imaged) policy that has been placed on the disk image.

At step 403, the security update policy (whether downloaded or imaged) is applied to the machine. In the currently preferred embodiment, the machine is restricted to only allow certain applications resident on the machine to connect to specific security-relevant sites that are specified in the security update policy (i.e., pre-access restricted zone). All other connections (e.g., from non-approved applications or processes, and/or to non-approved destinations) are denied. Optionally, the blocked connection may be redirected to a URL specified by the security update policy, for example to display a Web page to the user indicating what steps are required (namely, which updates are required) in order to fulfill the requirements of the security update policy. If desired, the redirection may execute a script that automatically guides the user through the required steps for updating the machine in accordance with the security update policy. Although the currently preferred embodiment focuses on security updates (thereby preventing infection/compromise of new machines), the security update policy may incorporate non-security tasks, such as updating a new machine to update for application bugs (whether or not they pose a security risk) that are now known at the time that the new machine is deployed. As indicated by step 404, once the machine has complied with the security update policy, the "restricted zone" is lifted and the machine may participate in general Internet connectivity (typically, in accordance with default firewall access rules, such as provided by Zone Labs' ZoneAlarm® product).

In accordance with the present invention, any and all access is restricted until the machine is brought into compliance. One cannot predict the actual individual updates required to bring a new machine into compliance. What one can predict however are the site (in the case of a downloaded "updated" security update policy) or few sites (in the case of a predetermined security update policy) that one must visit in order to update the new machine in a manner that prevents infections/security breaches. By restricting new machines to only accessing and being accessible by trusted sites in the context of updating new machines, the approach of the present invention prevents infections which under prior art approaches are commonplace.

Handling an Attempt for Access by an Application

Figure 5:
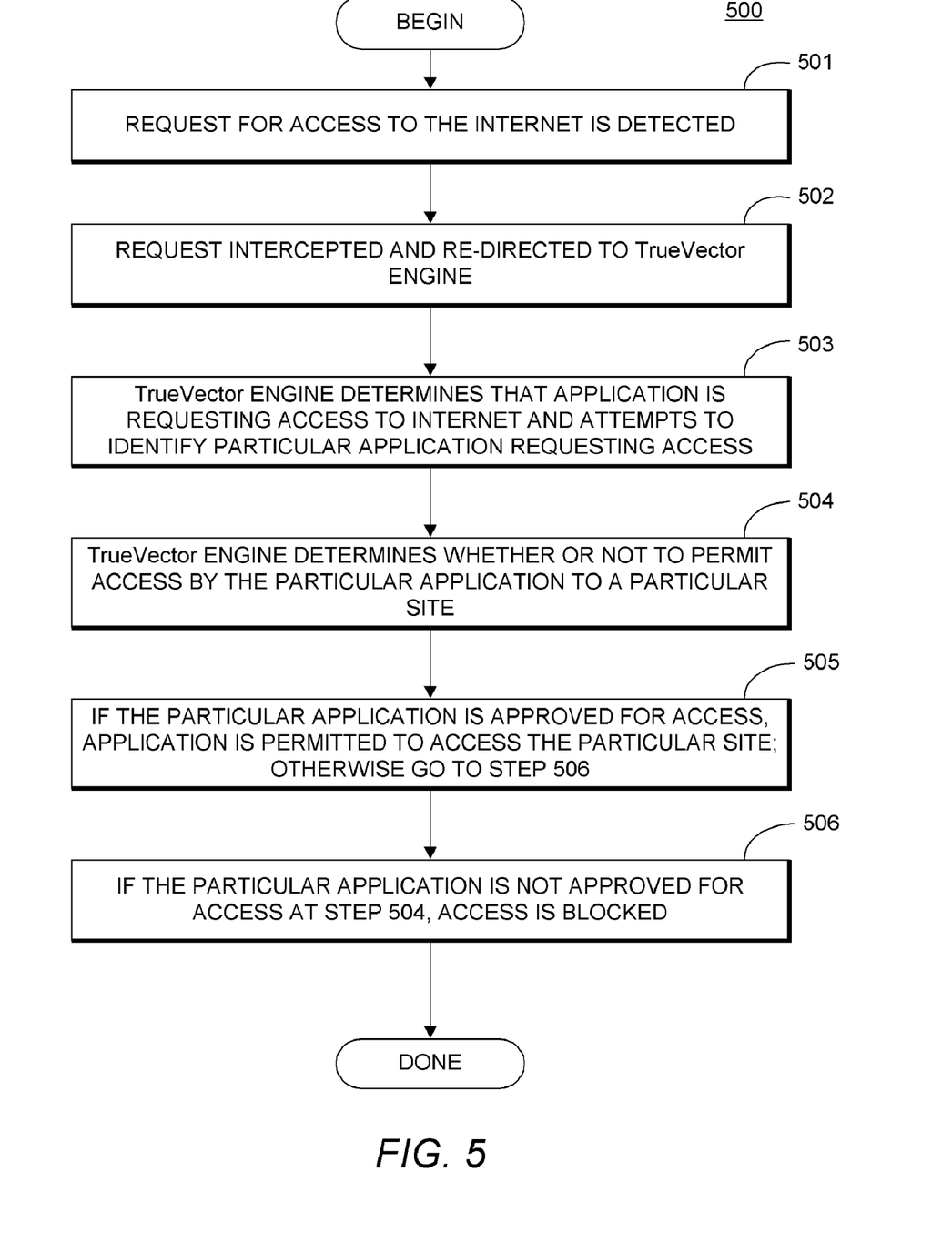
FIG. 5 is a flowchart illustrating the operations of the system of the present invention in determining whether to permit access by an application during the restricted access stage.

FIG. 5 is a flowchart 500 illustrating the operations of the system of the present invention in determining whether to permit access by an application during the restricted access stage. As previously described, a security update policy imaged on the hard disk during manufacturing or downloaded to the machine is applied to restrict access to the machine until security-related updates to the machine may be completed. A restricted zone is defined for the machine to only allow certain applications resident on the machine to connect to specific security-relevant sites.

The process for determining whether or not an application on the machine is to be permitted to access a particular site generally proceeds as described below. The following uses an example in a Windows environment; however a similar process is also applicable in other operating environments. The process commences at step 501 when a request for access to the Internet by a particular application is detected. In a Windows environment, for example, an application requesting Internet access typically connects via a Winsock (Windows socket) interface. At step 502, this request for access is intercepted and re-directed to the TrueVector engine. At step 503, when the request is received by the TrueVector engine, the engine determines that an application is requesting access to the Internet and attempts to identify the particular application making the request (e.g., from a unique fingerprint of the application).

After identifying the application, the TrueVector engine then determines whether or not to permit the access requested by the application at step 504. The TrueVector engine may consult a database or policy module to determine the policy applicable to this particular application. In the presently preferred embodiment, the policy database generally indicates if an application has been specifically approved for Internet access, has specifically been blocked (i.e., not approved for access), has not yet been evaluated, or is subject to a policy which provides for asking the user of the device whether or not to permit access. Currently, an application permission rule may be configured for one or more application(s) on a machine, that requires issuance of a notification (e.g., through issuance of an alert or prompt to the user interface) requesting a decision from the user as to whether or not to permit access by such application(s) to access a local (or trusted) zone and/or the Internet. In this case, however, the pre-defined security update policy specifies a restricted zone that provides that only certain specific applications are permitted to access a particular set of sites. Accordingly, the engine determines whether or not this particular application is one of the applications that is permitted to access the Internet (e.g., for purposes of updating security on the machine). If the application is permitted to access the Internet, a check is made to determine if the site which the application is attempting to access is one that is allowed under the rules (security update policy). The IP address for the site which the application seeks to communicate with is compared against a list of allowed addresses. Certain sites can have multiple IP addresses. Accordingly, the system of the present invention currently stores the IP addresses with the respective Web sites, so that a particular site can be resolved at the level of its individual IP addresses. In this manner, the system of the present invention permits access based either on a Web site name (e.g., www.cnn.com) or based on a particular IP address.

If the particular application is approved for access and the requested site is on the list of allowed addresses, the application is permitted to access the site as provided at step 505. However, if the particular application is not one approved for access, or if the site is not on the approved list of addresses, then communication is blocked as provided at step 506. Generally, the application is blocked from connecting to the site until the security update process has been completed. Optionally, the blocked connection may be redirected to a URL specified in the security update policy for facilitating compliance with the security update policy as described above.

In an alternative embodiment, instead of blocking access which is prohibited by the security update policy, an event or alert may be sent to the user interface requesting a response from the user as to whether or not the requested access to the Internet should be permitted. The user may then be informed that is unsafe to permit access by the application until the security-relevant updates have been completed. However, the user may be given the option to override the restriction and allow access by the application.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for controlling connections to a new computer upon its initial deployment, the method comprising:
   before deployment of the new computer, imaging the computer's storage to include a preconfigured security update policy for preventing Internet-borne infections occurring before the computer can obtain security-relevant updates;
   upon the initial deployment of the new computer, applying said preconfigured security update policy to establish at the computer a pre-access restricted zone of at least one preapproved host that the computer is restricted to connect to upon its initial deployment for obtaining current security-relevant updates, so that without relying on any external network-based security mechanisms the computer is provided with a fully self-contained enforcement mechanisms that completely blocks the computer from all other connectivity to the Internet until security-relevant updates have been completed;
   receiving a request for a connection from the computer to a particular host;
   based on said preconfigured security update policy, determining whether the particular host is within the restricted zone of at least one preapproved host;
   blocking said connection if said particular host is not within the restricted zone of at least one preapproved host; and
   once the computer has complied with the security update policy, lifting the restricted zone so that the computer is allowed to participate with general connectivity to the Internet.

2. The method of claim 1, further comprising:
   prior to the initial deployment of the computer, imaging a hard disk of the computer with said preconfigured security update policy.

3. The method of claim 1, wherein the computer comprises a portable computer and the initial deployment includes establishing Internet connectivity.

4. The method of claim 1, wherein the restricted zone comprises a pre-access restricted zone specifically for a new machine.

5. The method of claim 1, wherein said preconfigured security update policy operates to prevent the computer from being remotely accessed by another computer upon the initial deployment.

6. The method of claim 1, wherein said preconfigured security update policy operates to prevent the computer from being remotely probed for vulnerabilities by other computers.

7. The method of claim 1, wherein said preconfigured security update policy operates to prevent the computer from being infected by a malicious program delivered through an open port.

8. The method of claim 1, wherein said blocking step includes:
   instructing a firewall, which is responsive to said preconfigured security update policy, to block connections to any host that is not within the restricted zone of at least one preapproved host.

9. The method of claim 1, wherein the at least one preapproved host comprises specific security-relevant sites.

10. The method of claim 9, wherein specific security-relevant sites include antivirus Web sites.

11. The method of claim 9, wherein specific security-relevant sites include firewall Web sites.

12. The method of claim 9, wherein specific security-relevant sites include end point security Web sites.

13. The method of claim 1, wherein other attempted connections to the computer are refused.

14. The method of claim 1, further comprising:
   upon the computer completing updating of security subsystems, removing the restricted zone so that the computer may connect to other machines.

15. The method of claim 14, wherein the restricted zone is removed by replacing the preconfigured security update policy with an updated security update policy.

16. The method of claim 1, wherein the preconfigured security update policy is preinstalled on the computer prior to user purchase.

17. The method of claim 1, wherein the computer includes a hard disk having a manufacturer-provided disk image, and wherein the manufacturer-provided disk image includes the preconfigured security update policy.

18. The method of claim 1, wherein the computer is not allowed to participate with general connectivity to the Internet until security-relevant updates have been performed.

19. The method of claim 18, further comprising:
   providing an option that allows a user to override the preconfigured security update policy.

20. The method of claim 19, further comprising:
   providing a warning to any user that overrides the preconfigured security update policy.

21. The method of claim 19, further comprising:
   displaying a disclaimer to any user that overrides the preconfigured security update policy that indicates that the user assumes responsibility.

22. The method of claim 9, wherein specific security-relevant sites include operating system-related Web sites.

23. The method of claim 1, further comprising:
   upon a first attempted connection of the computer, downloading an updated list of hosts that the computer may initially connect to.

24. A computer-readable medium having processor-executable instructions for performing the method of claim 1.

25. The method of claim 1, further comprising:
   downloading a set of processor-executable instructions for performing the method of claim 1.

26. A computer system that is preconfigured to control connections upon the initial connections upon the initial deployment, the system comprising:
   a new computer that, before deployment, is imaged to include a preconfigured security update policy that establishes a restricted zone of at least one preapproved host that the computer is restricted to connect to upon the initial deployment of the computer, so that without relying on any external network-based security mechanisms the computer is provided with a fully self-contained enforcement mechanism that completely blocks the computer from all other connectivity to the Internet until security relevant updates have been completed;

a connectivity module for processing user requests for the computer to connect to a particular host; and a security module, located at the computer, for determining whether the particular host is within the restricted zone of at least one preapproved host based on said preconfigured security update policy, and for blocking any attempt to connect to a host that is not within the restricted zone of at least one preapproved host, until the computer is brought into compliance with the security update policy.

27. The system of claim 26, further comprising:

a hard disk that receives a hard disk image having said preconfigured security update policy.

28. The system of claim 26, wherein the computer comprises a portable computer and the initial deployment includes establishing Internet connectivity.

29. The system of claim 26, wherein the restricted zone comprises a pre-access restricted zone specifically for a new machine.

30. The system of claim 26, wherein said preconfigured security update policy operates to prevent the computer from being remotely accessed by another computer upon the initial deployment.

31. The system of claim 26, wherein said preconfigured security update policy operates to prevent the computer from being remotely probed for vulnerabilities by other computers.

32. The system of claim 26, wherein said preconfigured security update policy operates to prevent the computer from being infected by a malicious program delivered through an open port.

33. The system of claim 26, wherein the security module blocks attempts by instructing a firewall, which is responsive to said preconfigured security update policy, to block connections to any host that is not within the restricted zone of at least one preapproved host.

34. The system of claim 26, wherein the at least one preapproved host comprises specific security-relevant sites.

35. The system of claim 34, wherein specific security-relevant sites include antivirus Web sites.

36. The system of claim 34, wherein specific security-relevant sites include firewall Web sites.

37. The system of claim 34, wherein specific security-relevant sites include end point security Web sites.

38. The system of claim 26, wherein other attempted connections to the computer are refused.

39. The system of claim 26, further comprising:

a module for removing the restricted zone so that the computer may connect to other machines.

40. The system of claim 39, wherein the restricted zone is removed by replacing the preconfigured security update policy with an updated security update policy.

41. The system of claim 26, wherein the preconfigured security update policy is preinstalled on the computer prior to user purchase.

42. The system of claim 26, wherein the computer includes a hard disk having a manufacturer-provided disk image, and wherein the manufacturer-provided disk image includes said preconfigured security update policy.

43. The system of claim 26, wherein the computer is not allowed to participate with general connectivity to the Internet until security-relevant updates have been performed.

44. The system of claim 43, wherein the security module includes an option that allows a user to override the preconfigured security update policy.

45. The system of claim 44, wherein the security module displays a warning to any user that overrides the preconfigured security update policy.

46. The system of claim 44, wherein the security module displays a disclaimer to any user that overrides the preconfigured security update policy that indicates that the user assumes responsibility.

47. The system of claim 34, wherein specific security-relevant sites include operating system-related Web sites.

48. The system of claim 26, wherein the security module downloads an updated list of hosts that the computer may initially connect to.

49. A method for enforcing pre-access connectivity restrictions on a new machine so as to enforce security updates, the method comprising:

before deployment, incorporating into the new machine an initial security update policy that prevents computer infections occurring before the new computer can obtain security-relevant updates;

detecting attempts to connect the new machine to other devices;

determining at the new machine, based on an said initial security update policy that establishes a restricted zone of acceptable connections, which devices the new machine is permitted to connect to, so that without relying on any external network-based security mechanisms the machine is provided with a fully self-contained enforcement mechanisms that prevents the machine from participating with general connectivity to the Internet until security-relevant updates have been applied to the machine; and blocking at the new machine any connection that attempts to connect the new machine to a device outside the restricted zone of acceptable connections, so that the machine cannot participate with general connectivity to the Internet until the machine is brought into compliance with the security update policy.

50. The method of claim 49, further comprising:

prior to the initial deployment of the new machine, imaging a hard disk of the new machine with said initial security update policy.

51. The method of claim 49, wherein the new machine comprises a portable computer and the initial deployment includes establishing Internet connectivity.

52. The method of claim 49, wherein said restricted zone comprises a pre-access restricted zone specifically for a new machine.

53. The method of claim 49, wherein said initial security update policy operates to prevent the new machine from being remotely accessed by another computer upon the initial deployment.

54. The method of claim 49, wherein said initial security update policy operates to prevent the new machine from being remotely probed for vulnerabilities by other computers.

55. The method of claim 49, wherein said initial security update policy operates to prevent the new machine from being infected by a malicious program delivered through an open port.

56. The method of claim 49, wherein said blocking step includes:

instructing a firewall, which is responsive to said initial security update policy, to block connections to any host that is not within the restricted zone of at least one preapproved host.

57. The method of claim 56, wherein the at least one preapproved host comprises specific security-relevant sites.

58. The method of claim 57, wherein specific security-relevant sites include antivirus Web sites.

59. The method of claim 57, wherein specific security-relevant sites include firewall Web sites.

60. The method of claim 57, wherein specific security-relevant sites include end point security Web sites.

61. The method of claim 49, wherein other attempted connections to the new machine are refused.

62. The method of claim 49, further comprising:
upon the new machine completing updating of security subsystems, removing the restricted zone so that the new machine may connect to other machines.

63. The method of claim 62, wherein the restricted zone is removed by replacing the initial security update policy with an updated security update policy.

64. The method of claim 49, wherein the initial security update policy is preinstalled on the new machine prior to user purchase.

65. The method of claim 49, wherein the new machine includes a hard disk having a manufacturer-provided disk image, and wherein the manufacturer-provided disk image includes said initial security update policy.

66. The method of claim 49, wherein the new machine is not allowed to participate with general connectivity to the Internet until security-relevant updates have been completed.

67. The method of claim 66, further comprising:
providing an option that allows a user to override the initial security update policy.

68. The method of claim 67, further comprising:
providing a warning to any user that overrides the initial security update policy.

69. The method of claim 67, further comprising:
displaying a disclaimer to any user that overrides the initial security update policy that indicates that the user assumes responsibility.

70. The method of claim 57, wherein specific security-relevant sites include operating system-related Web sites.

* * * * *